May 31, 1966     J. W. HICKS, JR     3,253,500
DOUBLY CLAD LIGHT-CONDUCTING FIBERS WITH THE OUTER CLADDING
BEING PARTIALLY LIGHT ABSORBING
Original Filed Aug. 28, 1958

INVENTOR
JOHN W. HICKS, JR.

BY *J. Albert Vallquist*

ATTORNEY

United States Patent Office 3,253,500
Patented May 31, 1966

3,253,500
DOUBLY CLAD LIGHT-CONDUCTING FIBERS WITH THE OUTER CLADDING BEING PARTIALLY LIGHT ABSORBING
John W. Hicks, Jr., Fiskdale, Mass., assignor to American Optical Company, Southbridge, Mass., a voluntary association of Massachusetts
Continuation of application Ser. No. 12,143, Mar. 1, 1960, which is a division of application Ser. No. 757,850, Aug. 28, 1958, now Patent No. 3,060,789. This application May 11, 1964, Ser. No. 366,419
3 Claims. (Cl. 88—1)

The instant application is a continuation of applicant's copending application, Serial No. 12,143, filed March 1, 1960, now abandoned, which is a division of application Serial No. 757,850, filed August 28, 1958, and now issued as Patent No. 3,060,789.

This invention relates to light-conducting fibers or the like and light-transferring devices formed therefrom and has particular reference to improvements in light-conducting fibers of the light-insulated or clad type having core parts of glass or similar materials of a relatively high index of refraction and further having outer coatings or claddings of light absorbent glass or other similar materials of a relatively low index of refraction and method of making the same.

In making light-conducting fibers of the above character, it has been the usual practice to select glasses (or other similar materials) for the core and cladding parts thereof which differ sufficiently in index of refraction to provide the fiber with a relatively large aperture angle of the entering light which will be totally transmitted through the core of the fiber from end to end. Light entering fiber optical light-transferring devices formed of fibers of the above character from angles greater than the aperture angles of the particular fibers will not be completely transmitted through the core parts of the fibers since in entering the fibers, it will strike the interfacial surface between the core and cladding parts thereof at an angle beyond the critical angle of reflection of said surface and pass into the claddings and thereafter be scattered or refracted into adjacent fibers to form a background of stray light.

In instances where such devices are used to conduct or transfer image-forming light, the above-mentioned background of stray light is extremely disturbing in that it tends to dilute or wash out the image-forming light being transferred through the core parts of the fibers and, in general, reduces the efficiency of the fibers.

A primary object of this invention is to provide improved light-conducting fibers and/or light-transferring devices of the above-mentioned light-insulated or clad type which are adapted to efficiently transfer, from end to end, all light which enters the same within the maximum aperture angles of the fibers with substantially no interference from light which enters said fibers at angles greater than said maximum aperture angles thereof.

Another object is to provide improved coated or clad light-conducting fibers of the above character wherein said coatings or claddings are adapted to attenuate stray light within the fibers substantially without sacrifice of the overall light-conducting efficiency of the fibers.

Another object is to provide light-absorbing coating or cladding materials for light-conducting fibers which materials, when in use, will absorb substantially only light which has entered the fibers at angles beyond the critical angle of reflection of the interface between the light-conducting core and cladding parts of the fibers.

A further object is to provide a light-absorbing coating or cladding on light-conducting fibers which cladding is of a material permitting the fibers to be reworked as by reshaping and/or re-drawing either individually or in assembled or grouped formation.

A still further object is to provide simple, efficient and relatively economical means and method for improving the light-conducting efficiency of coated or clad light-conducting fibers or devices formed therefrom.

Other objects and advantages of the invention will become apparent from the following description when taken in conjunction with the accompanying drawings in which.

Figure 3:
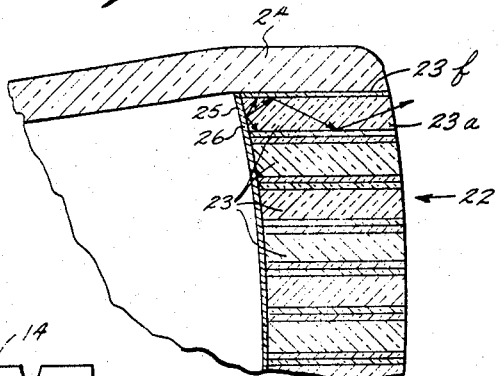
Figure 4:
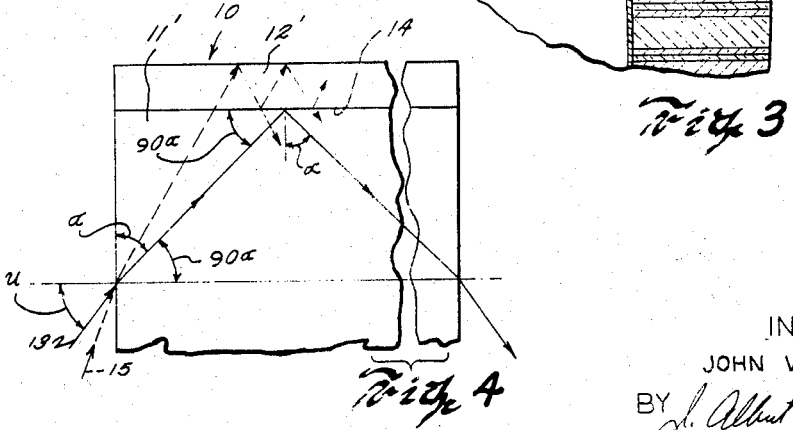

FIG. 3 is an enlarged fragmentary cross-sectional view of a cathode ray tube face plate which has been formed of light-conducting fibers of the character of this invention, said face plate being shown to illustrate the fibers of the invention in a condition of use; and FIG. 4 is a diagrammatic illustration of the light-conducting characteristics of the coated or clad light-conducting fibers of the invention.

Figure 1:
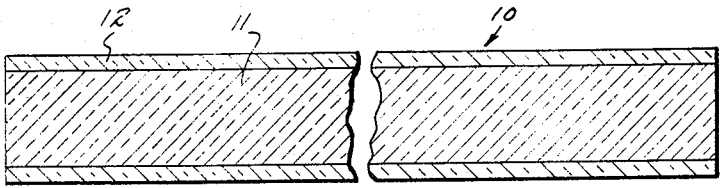
FIG. 1 is a greatly enlarged longitudinal cross-sectional view of the one form of light-conducting fiber embodying the invention.

In FIG. 1, there is shown a light-conducting fiber 10 which, for purpose of illustration, will be considered to be formed of glass and embodying a core 11 of a high-index flint glass or the like with a relatively thin outer coating or cladding 12 of a relatively low-index light-absorbing glass which will be discussed in greater detail hereinafter. The opposite ends of the fiber 10 are optically finished to render the same receptive to light.

Fibers such as shown in FIG. 1 may be constructed by placing a rod-like member of the high-index glass within a tubular member of the low-index glass, heating and causing said tubular member to collapse and fuse with the rod-like member, heating the assembly thus formed to a suitable fiber-drawing viscosity and thereafter drawing the assembly down to a desired fiber size. It is pointed out that light-conducting fibers of the type embodying this invention may be formed by any of the known techniques common to the manufacture of conventional individually light-insulated or clad fibers.

In FIG. 4, there is diagrammatically illustrated, for purposes of better understanding this invention, a greatly enlarged portion of a light-conducting fiber 10' having a core part 11' and a cladding 12'. A maximum entrance angle $u$ is shown in FIG. 4, at which a ray of light 13 may enter the fiber 10' and be totally reflected at the interfacial surface 14 between the core 11' and cladding 12', the critical angle of reflection in this case being the angle $\alpha$. All rays of light entering the core 11' and striking the interface 14 at a greater angle than $\alpha$ will be substantially totally reflected at the surface 14. However, light rays such as 15 which enter the fiber at an angle greater than $u$ will strike the interface at an angle smaller than the critical angle of reflection $\alpha$ and pass on into the cladding 12' to be at least partially reflected back into the core part 11' as a background of stray light generally in the manner illustrated by the dash lines. A measure of the maximum aperture angle of the entering light which will be transmitted through the fiber from end to end may be made as follows where $n_1$ is the index of refraction of the core 11' and $n_2$ is the index of refraction of the cladding 12':

$$\sin(90-\alpha) = \cos\alpha$$

$$\sin u = n_1 \cos\alpha$$

$$\cos\alpha = \sqrt{1-\sin^2\alpha}$$

$$\sin u = n_1\sqrt{1-\sin^2\alpha}$$

$$\sin^2 u = \frac{n_2^2}{n_1}$$

$$\sin u = n_1 \sqrt{1 - \frac{n_2^2}{n_1^2}}$$

$$\sin u = \sqrt{n_1^2 - \frac{n_1^2 n_2^2}{n_1^2}}$$

$$\sin u = \sqrt{n_1^2 - n_2^2}$$

In accordance with this invention, the cladding 12 of the fiber 10 is formed of a light-absorbing glass having carefully selected absorption characteristics such that substantially only the light entering the fiber 10 within the maximum aperture angle of the fiber will be transferred through the fiber, whereas light entering the fiber at angles beyond the maximum aperture angle will be absorbed by the cladding 12 upon striking the interface between the core and cladding.

The selection of the cladding and core glasses which, in combination with each other, will produce the above results is made in accordance with the cross-sectional sizes and lengths desired of the fibers and the relative thickness of the core and cladding parts thereof as follows:

Let $k =$ the ratio of volume of cladding glass to core glass which is determined from the relative clad thickness desired of the fiber to be fabricated and let $l =$ the length of said fiber. Then, in a thickness $kl$ of the light-absorbing cladding glass which is to be used to clad the fiber, the absorption should be sufficient to give a transmission of approximately 10%. Any transmission appreciably over 10% will permit an undesirable amount of stray light to re-enter the core part of the fiber and any transmission appreciably below said 10% will cause the coating to absorb an undesirable amount of the light entering the fiber within its maximum aperture angle. For example, if a fiber were to be constructed 12 inches long with a light-absorbing cladding which is of a thickness equal to 10% of the overall thickness of the fiber, the absorption of the cladding glass should be such as to cause a sample or piece of said glass which is 1.2 inches thick to transmit approximately only 10% of light which is directed therethrough.

It is to be understood that the degree of absorption required for the cladding glass would be greater if signal-to-noise ratio (image light to background light) is of extreme importance or less if maximum signal transmission (transmission of image light only) is of greatest importance.

A neutral light-absorbing crown glass suitable for use in forming light-absorbing coatings of the character of this invention may be formed by mixing equal quantities of chromic oxide and gold chloride with a relatively low index crown glass during the making of the crown glass in amounts controlled in accordance with the degree of light absorption desired of said glass. It is emphasized that this invention is in no way restricted to the particular glass composition just given since the techniques used to produce light-absorbing glass are numerous and well known to those skilled in the glass making industry. Furthermore, it may be desirable, for certain applications of use, to form fibers of the above type with light-absorbing coatings or claddings which are not neutral. That is, rather than being absorptive to white light, it may be desirable to render said claddings absorptive to light at other points on the spectrum such as ultra-violet, infra-red, or the like, light-absorbing glasses of this type also being well known in the art of glass making.

Fibers such as shown in FIG. 1 may be fabricated by placing a rod of core glass 11 within a tube of the cladding glass 12 having a sidewall thickness carefully proportioned in accordance with the relative thicknesses desired of the core and cladding parts of the fiber to be formed and having light-absorbing abilities such as discussed above. When assembled, the rod and tube are heated to a fiber drawing viscosity and drawn to fiber size whereupon the relative thicknesses of the core and cladding parts will retain the proportions of the initial rod and tube assembly regardless of the extent to which said assembly is drawn. The light-absorbing coating 12 of the fiber, being of a glass or other similar heat-softenable material, will permit fibers of the character of this invention to be formed by conventional fiber drawing technique and, accordingly, will permit said fibers to be re-shaped or re-drawn as desired, either individually or as a group in assembled relation with each other. In any case, a re-shaping or re-drawing of the fibers will not alter the light-conducting and light-absorbing capabilities of the fibers.

Figure 2:
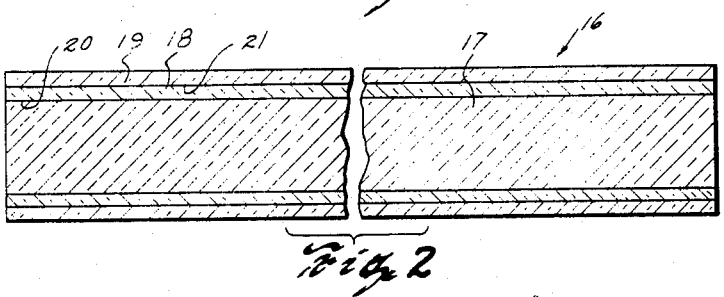
FIG. 2 is a greatly enlarged longitudinal cross-sectional view of another form of light-conducting fiber embodying the invention.

Since, in a fiber such as shown in FIG. 1, the light-absorbing coating 12 will inherently absorb, to some small degree, portions of the light which has entered the fiber within its maximum aperture angle, it has been found advantageous to provide a multiple coating on the core part of a fiber in the manner illustrated more particularly by FIG. 2. In FIG. 2, the fiber 16 comprises a core part 17 of a relatively high index flint glass or the like having a coating or cladding 18 of a clear relatively low-index crown glass or the like and an outer coating or cladding 19 of a light-absorbing glass such as, for example, a glass similar to the glass 12 of the fiber 10.

With a fiber construction of this nature (FIG. 2) the light entering the core 17 within the maximum aperture angle (which may be calculated for the particular core 17 and cladding 18 glasses in the manner described above) will be substantially totally internally reflected at the interface 20 and transmitted through the core 17 of the fiber 16 to emerge at its exit end. However, light which enters the fiber 17 so as to strike the interface 20 at angles beyond the critical angle of reflection thereof will pass through the cladding 18 and upon striking the interface 21 between the claddings 18 and 19, will be substantially completely absorbed by the glass of the cladding 19 and thereby prevented from re-entering the core 17 as background of stray light. Since the cladding 18, being a clear crown glass or the like, will not absorb light, all of the light within the aperture angle of the fiber 16 will be internally reflected at the interface 20 and transferred through the fiber without in any way contacting the outer light-absorbing coating 19. Therefore, the coating 19 may, if desired, be formed of a material having greater light-absorbing abilities than the coating 12 of FIG. 1 so as to assure a complete absorption of the light which enters the cladding 18. That is, for a sample of the light-absorbing glass 19 which is of a thickness $kl$ (where $k=$the ratio of the volume of cladding to core glass which is determined from the relative cladding 19 thickness desired of the fiber 16 and $l=$the length of the fiber 16) the sample should be capable of absorbing at least 90% of light which is projected therethrough. In the case of the fiber 16, the light-absorbing coating 19 may be such as to absorb more than 90% of the light projected therethrough, whereas the coating or cladding 12 of the fiber 10 (FIG. 1) must have controlled light-absorbing characteristics such that it will not appreciably absorb more or less than 90% of light which is projected through a sample thereof which is of a thickness $kl$ for the reasons set forth above.

For a fiber such as 16 (FIG. 2) the outer cladding 19 would preferably be a low index glass in which case the inner cladding 18 may be as little as ½ wavelength thick. If, however, the outer cladding 19 were a relatively high index glass, or extremely absorbent, the inner cladding should be at least 2 wavelengths thick.

It is pointed out that fibers of the character of this invention are readily adaptable to all fiber optical devices and are of particular value when used in the fabrication of optical image-forming and transporting or transferring devices such as, for example, a cathode ray tube face plate 22 of the type diagrammatically illustrated in FIG. 3 wherein a multiplicity of clad light-conducting fibers 23 are connected together in side-by-side relation with each other and optically finished at their opposite ends to form means by which image-forming light produced internally of the tube 24 may be directly transferred through the face plate 22 and received at its front surface.

With the phosphor 25 of the kinescope 24 placed in optical contact with the inner ends of the fibers 23, it is obvious that from each point source of light 26 which is produced by the phosphor, a full Lambertian cone of light will be directed into the core glass 23a of the fibers 23. That is, light rays will enter the fiber throughout a full 180° angle and, therefore, a substantial portion of said light rays which enter the core glass 22 at an angle beyond the critical angle of reflection at the interface between the core glass 23a and the cladding 23b will pass into the core glass 23b. In conventional clad fibers, the light entering the claddings of the fibers would be partially transferred through the same and into adjoining fibers and partially reflected back into the original fiber whereby said light would be scattered throughout the fibers of the face plate 22 as background of stray light. Since the exit ends of the fibers are in air, they will not allow light approaching the same at excess angles to emerge therefrom, portions of said stray light which get back to the phosphor cause a washing-out or dilution of the original image-forming light produced thereby and cause an overall deterioration of the total image at the viewing face of the tube 24.

By fabricating face plates such as 22, or other similar fiber optical devices, of fibers which are constructed in accordance with this invention, the light-absorbing outer cladding of the fibers will prevent said light entering the fibers at angles beyond the critical angles of reflection thereof from destroying the image-forming light which is passed from end to end through the fibers.

It is to be understood that the face plate 22 of FIG. 3 has been shown and described as an example of one use for light-conducting fibers of the type embodying this invention and that other devices such as endoscopes, gastroscopes or fiber optical probes of all types may be rendered more efficient in transferring image-forming light if constructed of light-conducting fibers of the character of this invention.

From the foregoing, it will be seen that simple, efficient and economical means and method have been provided for accomplishing all the objects and advantages of the invention as expressed in the accompanying claims and the invention is not to be limited to the exact matters shown and described as only the preferred matters have been given by way of illustration.

I claim:

1. A light-conducting fiber comprising a core, an inner cladding and an outer cladding all fused together, said core being formed of a transparent glass having a predetermined index of refraction, said inner cladding being formed of a transparent glass having an index of refraction of a lower value than that of said core glass, said outer cladding being formed of a glass which is partially transparent and partially light absorbing to receive and absorb a substantial amount of light reaching said outer cladding from said inner cladding, the light absorbency of the glass of said outer cladding being such that a thickness $kl$ of said glass will absorb at least 90% of light directed thereinto when $k$ equals the ratio of the volume of the glass of said cladding to the volume of the glass of said core and $l$ equals the length of the fiber.

2. A light-transmitting device having image-receiving and image-emitting opposite end faces comprising a plurality of light-conducting fibers of the character set forth in claim 1, said fibers being bundled together in side-by-side relationship with each other with corresponding opposite ends thereof arranged to collectively form said image-receiving and image-emitting opposite end faces.

3. A light-transmitting device as recited in claim 2 wherein the fibers are all fused together.

References Cited by the Examiner

UNITED STATES PATENTS

| 2,825,260 | 3/1958 | O'Brien | 88—1 X |
| 3,141,105 | 7/1964 | Courtney-Pratt | 88—1 X |

JEWELL H. PEDERSEN, *Primary Examiner.*

JOHN K. CORBIN, *Examiner.*